(12) United States Patent
Kim

(10) Patent No.: US 12,096,160 B2
(45) Date of Patent: Sep. 17, 2024

(54) LIGHT SOURCE CONTROL APPARATUS AND LAMP

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 283 days.

(21) Appl. No.: 17/736,246

(22) Filed: May 4, 2022

(65) Prior Publication Data
US 2022/0400238 A1    Dec. 15, 2022

(30) Foreign Application Priority Data

Jun. 14, 2021 (KR) .......... 10-2021-0077045
Nov. 18, 2021 (KR) .......... 10-2021-0159653

(51) Int. Cl.
*H04N 9/31* (2006.01)
*B60Q 1/08* (2006.01)
*F21S 41/153* (2018.01)

(52) U.S. Cl.
CPC ......... *H04N 9/3188* (2013.01); *H04N 9/3155* (2013.01); *H04N 9/3164* (2013.01); *B60Q 1/085* (2013.01); *B60Q 2300/00* (2013.01); *F21S 41/153* (2018.01)

(58) Field of Classification Search
CPC .. H04N 9/3188; H04N 9/3155; H04N 9/3164; H04N 9/3138; H04N 9/3185; H04N 9/3194; B60Q 1/085; B60Q 2300/00; B60Q 1/04; F21S 41/153
See application file for complete search history.

(56) References Cited

U.S. PATENT DOCUMENTS

| | | | |
|---|---|---|---|
| 6,392,689 B1 * | 5/2002 | Dolgoff ............... | H04N 13/363 348/E13.058 |
| 10,690,923 B1 * | 6/2020 | Luanava ............... | G02B 26/08 |
| 2016/0099009 A1 * | 4/2016 | Kim ...................... | H04S 7/307 381/17 |
| 2017/0277950 A1 * | 9/2017 | Sung .................... | G06V 40/193 |
| 2019/0340455 A1 * | 11/2019 | Jung ................... | G06F 18/2163 |
| 2020/0284883 A1 * | 9/2020 | Ferreira ............... | G01S 7/4811 |
| 2021/0173289 A1 * | 6/2021 | Wakabayashi ........ | G02F 1/1313 |
| 2023/0162324 A1 * | 5/2023 | Shi ......................... | H04N 5/74 382/299 |
| 2023/0353862 A1 * | 11/2023 | Yi ......................... | H04N 23/635 |

FOREIGN PATENT DOCUMENTS

| | | | | |
|---|---|---|---|---|
| DE | 102016006391 A1 * | 11/2017 | .............. | B60Q 1/08 |
| JP | 7278277 B2 * | 5/2023 | ......... | G02B 27/0075 |
| WO | WO-2019078340 A1 * | 4/2019 | ............ | H04N 5/225 |
| WO | WO-2021217367 A1 * | 11/2021 | | |
| WO | WO-2022022019 A1 * | 2/2022 | ........... | G06F 3/1454 |

* cited by examiner

*Primary Examiner* — Abdullah A Riyami
*Assistant Examiner* — Syed M Kaiser
(74) *Attorney, Agent, or Firm* — NovoTechIP International PLLC

(57) ABSTRACT

Disclosed is a light source control apparatus, which includes an image acquirer that obtains information about an image to be displayed from a light source matrix, and a controller that changes a resolution of the image based on the information about the image and controls an operation of the light source matrix such that the image having the changed resolution is displayed.

16 Claims, 20 Drawing Sheets

LIGHT SOURCE CONTROL APPARATUS
AND LAMP

CROSS-REFERENCE TO RELATED
APPLICATIONS

This application claims the benefit of priority to Korean Patent Application Nos. 10-2021-0077045 filed on Jun. 14, 2021, and 10-2021-0159653 filed on Nov. 18, 2021, respectively, in the Korean Intellectual Property Office, and the entire contents of which are incorporated herein by reference.

BACKGROUND

1. Technical Field

The present disclosure relates to a light source control apparatus and a lamp.

2. Discussion of Related Art

In general, headlamps of a vehicle are used to secure a front view stably when driving at night or in dark tunnels, fog, or rain conditions.

Recently, as the use of high-resolution LEDs is expanded, the high-resolution LEDs are also being used in the headlamps of a vehicle. Accordingly, technologies and applications for projecting images on a road surface using the headlamps of a vehicle are being developed.

In the case of the currently projected images, the resolution is gradually increasing. When an image with a high resolution is displayed on a display device with a low resolution, the image may not be displayed normally and only a part of the image may be displayed. In addition, when an image having a low resolution is displayed on a display device having a high resolution, the image may be displayed smaller than a normal size.

In the case of the headlamps of a vehicle, when an image is displayed on a road surface or a specific object, a problem that the entire image is not displayed may occur.

SUMMARY

The present disclosure has been made to solve the above-mentioned problems occurring in the prior art while advantages achieved by the prior art are maintained intact.

An aspect of the present disclosure provides a light source control apparatus that controls an operation of a light source matrix such that an image can be output in the same size by changing the resolution of the image to be displayed on a road surface.

Another aspect of the present disclosure provides a light source control apparatus that controls an operation of a light source matrix such that the resolution of an image to be displayed on a road surface is changed and the irradiation angle is changed depending on the presence or absence of an obstacle in front of the vehicle.

An aspect of the present disclosure provides a lamp that determines an area to project an image and accurately projects the image onto the determined area on which the image is to be projected.

An aspect of the present disclosure provides a lamp capable of recognizing a projection surface of an image and automatically setting a resolution of the image.

An aspect of the present disclosure provides a lamp capable of displaying an image on the projection surface by recognizing the projection surface of the image and by setting the resolution of the image or performing an auto-leveling.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a light source control apparatus includes an image acquirer configured to obtain information about an image to be displayed from a light source matrix, and a controller configured to change a resolution of the image based on the information about the image and to control an operation of the light source matrix such that the image having the changed resolution is displayed.

According to an embodiment, the information about the image may include resolution information of the image.

According to an embodiment, the controller may compare the resolution information of the image with a resolution information represented by the light source matrix, and may calculate the number of pixels of the image to be represented by each of light sources included in the light source matrix when the resolution information of the image is greater than the resolution information represented by the light source matrix.

According to an embodiment, the controller may set the pixels of the image to be displayed by the each of the light sources based on the calculated number of pixels.

According to an embodiment, the controller may calculate an average of image information of a plurality of pixels to allow the each of the light sources to display the pixels when the each of the light sources displays the plurality of pixels of the image.

According to an embodiment, the controller may calculate the number of light sources included in the light source matrix corresponding to one pixel of the image when the resolution information of the image is less than the resolution information represented by the light source matrix.

According to an embodiment, the controller may match each of the image pixels to the each of the light sources included in the light source matrix based on the calculated number of light sources, and may allow the each of the light sources to display the corresponding image information.

According to an embodiment, a light source control apparatus may further include an information acquirer that obtains information about an obstacle in front of a vehicle from a sensor, and the controller may change the resolution of the image based on the information about the obstacle in front of the vehicle.

According to an embodiment, the controller may calculate a distance at which the light source matrix projects the image, based on the information about the obstacle in front of the vehicle, and may change the resolution of the image based on the calculated distance.

According to an embodiment, the controller may allow the light source matrix to lower an irradiating angle to avoid an obstacle, when there is the obstacle in front of the vehicle.

According to an embodiment, the controller may increase an irradiating angle of the light source matrix and allow the image to be projected on a wall, when it is determined that the obstacle is the wall.

According to an embodiment, the controller may lower the resolution of the image and may allow the light source matrix to display the lowered resolution image, when the vehicle is in a power saving mode or a standby mode in which an ignition is not turned on.

According to an aspect of the present disclosure, an operating method of a light source control apparatus includes obtaining information about an image to be displayed from a light source matrix, changing a resolution of the image based on the information about the image, and controlling an operation of the light source matrix such that the image having the changed resolution is displayed.

According to an embodiment, the changing of the resolution of the image based on the information about the image may include comparing the resolution information of the image with a resolution information represented by the light source matrix, calculating the number of pixels of the image to be represented by each of light sources included in the light source matrix when the resolution information of the image is greater than the resolution information represented by the light source matrix, and setting the pixels of the image to be displayed by the each of the light sources based on the calculated number of pixels.

According to an embodiment, the changing of the resolution of the image based on the information about the image may include comparing the resolution information of the image with a resolution information represented by the light source matrix, calculating the number of light sources included in the light source matrix corresponding to one pixel of the image when the resolution information of the image is less than the resolution information represented by the light source matrix, and matching each of the image pixels to the each of the light sources included in the light source matrix based on the calculated number of light sources.

According to an embodiment, the operating method of the light source control apparatus may further include obtaining information about an obstacle in front of a vehicle from a sensor, and changing the resolution of the image based on the information about the obstacle in front of the vehicle.

According to an embodiment, the changing of the resolution of the image based on the information about the obstacle in front of the vehicle may include calculating a distance at which the light source matrix projects the image, based on the information about the obstacle in front of the vehicle, and changing the resolution of the image based on the calculated distance.

According to an embodiment, the operating method of the light source control apparatus may further include allowing the light source matrix to lower an irradiating angle to avoid an obstacle, when there is the obstacle in front of the vehicle.

According to an embodiment, the operating method of the light source control apparatus may further include increasing an irradiating angle of the light source matrix and allowing the image to be projected on a wall, when it is determined that the obstacle is the wall.

According to an embodiment, the operating method of the light source control apparatus may further include determining that the vehicle is in a power saving mode or a standby mode in which an ignition is not turned on, lowering the resolution of the image, and allowing the light source matrix to display the lowered resolution image.

According to an aspect of the present disclosure, a lamp includes a sensor configured to sense an object in front of a vehicle, a display configured to display an image, and a controller configured to determine a first area on which the image is projected based on the sensed object and to set a second area in which the display displays the image corresponding to the first area.

According to an embodiment, the controller may determine whether the first area is a wall surface or a bottom surface based on the sensed object.

According to an embodiment, the controller may set the second area to display the image on the wall surface when the first area is the wall surface.

According to an embodiment, the controller may set the second area based on a distance between the wall surface and the vehicle when the first area is the wall surface.

According to an embodiment, the controller may set the second area to display the image on the bottom surface when the first area is the bottom surface.

According to an embodiment, the second area may be a low beam area of the display.

According to an embodiment, the lamp may further include a resolution setter that sets a resolution of the image to correspond to a size of the second area.

According to an embodiment, the resolution setter may decrease the resolution of the image to correspond to the number of pixels when the resolution of the image is equal to or greater than the number of pixels in the second area of the display.

According to an embodiment, the resolution setter may increase the resolution of the image to correspond to the number of pixels when the resolution of the image is less than the number of pixels in the second area of the display.

According to an embodiment, the lamp may further include a driving device that adjusts a projection angle of the display.

According to an embodiment, the controller may identify the resolution of the image and controls the driving device such that the image is displayed on all areas of the display when the resolution of the image is equal to or greater than the number of pixels of the display.

According to an embodiment, the sensor may include a distance sensing sensor or a camera.

According to an embodiment, an operating method of the lamp includes sensing an object in front of a vehicle, determining a first area to project the image based on the sensed object, setting a second area in which the display displays the image corresponding to the first area, and displaying the image.

According to an embodiment, the determining of the first area to project the image based on the sensed object may include determining whether the first area is a wall surface or a bottom surface based on the sensed object.

According to an embodiment, the operating method of the lamp may further include setting a resolution of the image to correspond to a size of the second area.

According to an embodiment, the operating method of the lamp may further include adjusting a projection angle of the display.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
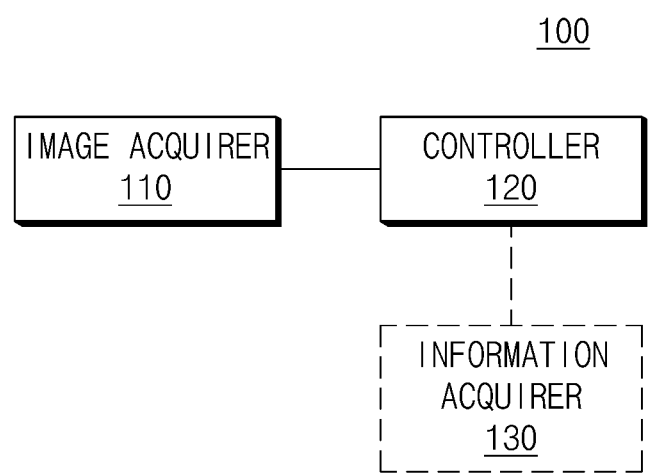
FIG. 1 is a block diagram illustrating a light source control apparatus, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A," "B," (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a light source control apparatus, according to an embodiment of the present disclosure.

Referring to FIG. 1, a light source control apparatus 100 according to an embodiment of the present disclosure may include an image acquirer 110 and a controller 120.

The image acquirer 110 may obtain (or receive) information about an image to be displayed in a light source matrix. For example, the information about the image may include at least one of resolution information of the image, image data of each pixel included in the image, or RGB data of each pixel included in the image.

The controller 120 may change the resolution of the image based on information about the image. For example, the controller 120 may change the resolution of the image based on resolution information of the image and resolution information that can be represented (or projected) by the light source matrix.

The controller 120 may compare the resolution information of the image with the resolution information that can be represented (or projected) by the light source matrix. For example, as the comparison result, when the resolution information of the image is greater than the resolution information that can be represented by the light source matrix, the controller 120 may calculate the number of pixels of the image that should be represented by each light source included in the light source matrix. In this case, the controller 120 may set pixels of the image to be displayed by each light source based on the calculated number of pixels.

In an embodiment, when each light source needs to display a plurality of pixels of the image, the controller 120 may calculate an average of image information (e.g., image values) of the plurality of pixels to allow each light source to display the pixels of the image. For example, when one light source needs to display four image pixels, the controller 120 may allow the light source to display the pixels of the image by calculating an average of RGB data of the four pixels. That is, when the resolution size of the image is greater than the resolution size that can be represented by the light source matrix, the controller 120 may lower the resolution of the image and may change it to a resolution size that can be represented by the light source matrix.

Figure 2:
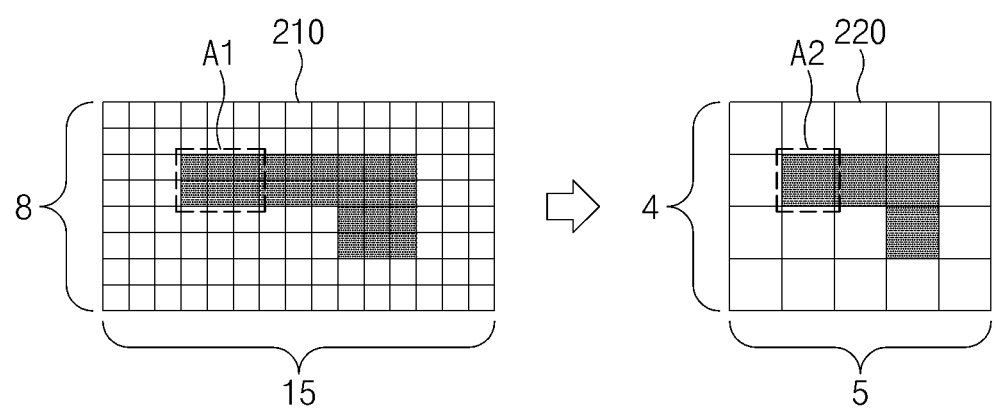
FIGS. 2 and 3 are diagrams illustrating how a resolution of an image is changed in a light source control apparatus, according to an embodiment of the present disclosure.

FIG. 2 is a diagram illustrating how a resolution of an image is changed in a light source control apparatus, according to an embodiment of the present disclosure.

Referring to FIG. 2, an image 210 to be displayed in a light source matrix may have a resolution of 15*8, and a light source matrix 220 may represent a resolution of 5*4. In this case, since the resolution of the image 210 is greater than the resolution that can be represented by the light source matrix 220, each light source included in the light source matrix may have to represent a plurality of image pixels.

Since a horizontal axis of the image 210 has a size of 15 pixels, but a horizontal axis of the light source matrix 220 can represent 5 pixels, each light source included in the light source matrix 220 may have to represent three horizontal axis pixels of the image 210. In addition, since a vertical axis of the image 210 has a size of 8 pixels, but a vertical axis of the light source matrix 220 can represent 4 pixels, each light source included in the light source matrix 220 may have to represent two vertical axis pixels of the image 210. That is, each light source included in the light source matrix 220 may have to represent pixels of the image 210 having a size of 3*2.

When the resolution of the image 210 is greater than the resolution that can be represented by the light source matrix 220, the controller 120 may calculate the number of image pixels that should be represented by each light source included in the light source matrix 220 through the above-described process. In FIG. 2, the controller 120 may calculate the number of pixels having the size of 3*2 of the image 210 that should be represented by each light source included in the light source matrix 220.

When the number and size of pixels of the image 210 to be represented by each light source included in the light source matrix 220 are calculated, the controller 120 may set (or select) pixels of the image to be projected by each light source. For example, the controller 120 may set that a portion A1 displayed in the image 210 in FIG. 2 corresponds to a portion A2 displayed in the light source matrix 220.

The controller 120 sets the pixels of the image to be represented by each light source, and when each light source needs to display a plurality of pixels of the image, the controller 120 may calculate an average of image information of the plurality of pixels to allow each light source to display the pixels. For example, the controller 120 may calculate an average of the image data of each pixel of the portion A1 displayed in the image 210, and may control an operation of the light source matrix 220 such that the calculated average value of the pixel image data is displayed on the portion A2 displayed in the light source matrix 220. For example, the controller 120 may calculate an average of the RGB data of each pixel of the portion A1 displayed in the image 210, and may control an operation of the light source matrix 220 such that the calculated average value is displayed on the portion A2 displayed in the light source matrix 220.

In FIG. 2, although the resolution of the image 210 is 15*8 and the resolution that can be represented in the light source matrix 220 is 5*4, the present disclosure is not limited thereto. That is, when the resolution of the image 210 is x*y (x and y are natural numbers greater than or equal to 1), and the resolution that can be represented by the light source matrix 220 is z*w (z and w are natural numbers greater than or equal to 1), the controller 120 may compare the resolution of the image 210 with the resolution that can be represented by the light source matrix 220, may calculate the number of image pixels that should be represented by each light source included in the light source matrix when the resolution of the image 210 is greater than the resolution that can be represented by the light source matrix 220 as the comparison result, and may set image pixels to be displayed in each light source based on the calculated number of pixels.

In an embodiment, when the resolution of the image 210 is divided by the resolution that can be represented by the light source matrix 220, it may not be divided by a natural number. In this case, the controller 120 may discard the remainder when the resolution of the image 210 is divided by the resolution that can be represented by the light source matrix 220, and may calculate the number of image pixels that should be represented by each light source included in the light source matrix 220.

Referring back to FIG. 1, when the controller 120 compares the resolution of the image with the resolution that can be represented by the light source matrix, the controller 120 may calculate the number of light sources included in the light source matrix corresponding to one image pixel when the resolution of the image is less than the resolution that can be represented by the light source matrix. For example, the controller 120 may divide the horizontal axis size of the resolution that can be represented by the light source matrix by the horizontal axis size of the image resolution, and may divide the vertical axis size of the resolution that can be represented by the light source matrix by the vertical axis size of the image resolution such that the number of light sources included in the light source matrix corresponding to the one image pixel is calculated.

The controller 120 may match each image pixel with each light source included in the light source matrix based on the calculated number of light sources. For example, the controller 120 may match one image pixel to a plurality of light sources. In this case, the controller 120 may allow each light source included in the light source matrix to display image information of an image pixel corresponding to each light source. That is, when the resolution size of the image is less than the resolution size that can be represented by the light source matrix, the controller 120 may change the resolution of the image to correspond to the size of the light source matrix.

Figure 3:
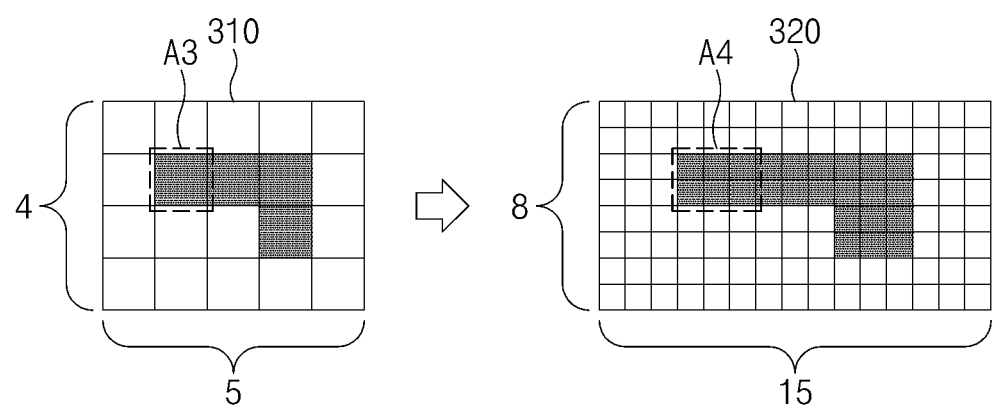

FIG. 3 is a diagram illustrating how a resolution of an image is changed in a light source control apparatus, according to an embodiment of the present disclosure.

Referring to FIG. 3, an image 310 to be displayed in a light source matrix may have a resolution of 5*4, and a light source matrix 320 may represent a resolution of 15*8. In this case, since the resolution of the image 310 is less than the resolution that can be represented by the light source matrix 320, each of the plurality of light sources included in the light source matrix may have to represent one image pixel.

Since a horizontal axis of the image 310 has a size of 5 pixels, and a horizontal axis of the light source matrix 320 can represent 15 pixels, three light sources included in the light source matrix 320 may have to represent one horizontal axis pixel of the image 310. In addition, since a vertical axis of the image 310 has a size of 4 pixels, and a vertical axis of the light source matrix 320 can represent 8 pixels, two light sources included in the light source matrix 320 may have to represent one vertical axis pixel of the image 310. That is, one pixel of the image 310 may have to be represented by the light sources having a size of 3*2 among the light sources included in the light source matrix 320.

When the resolution of the image 310 is less than the resolution that can be represented by the light source matrix 320, the controller 120 may calculate the number of light sources included in the light source matrix 320 that should represent the one pixel of the image 310 through the above-described process. In FIG. 3, the controller 120 may calculate that the light sources having a size of 3*2 among the light sources included in the light source matrix 320 should represent one pixel of the image 310.

The controller 120 may correspond each pixel of the image 310 to each light source included in the light source matrix 320, based on the calculated number of light sources. For example, the controller 120 may set that a portion A3 displayed in the image 310 in FIG. 3 corresponds to a portion A4 displayed in the light source matrix 320. That is, the controller 120 may set that all of the light sources included in the portion A4 correspond to the image pixel of the portion A3.

The controller 120 may control an operation of the light source matrix 320 such that each light source included in the light source matrix 320 displays data of corresponding image pixels.

In FIG. 3, although the resolution of the image 310 is 5*4 and the resolution that can be represented in the light source matrix 320 is 15*8, the present disclosure is not limited thereto. That is, when the resolution of the image 310 is x*y (x and y are natural numbers greater than or equal to 1), and the resolution that can be represented by the light source matrix 320 is z*w (z and w are natural numbers greater than or equal to 1), the controller 120 may compare the resolution of the image 310 with the resolution that can be represented by the light source matrix 320, may calculate the number of light sources included in the light source matrix 320 to represent one pixel of the image 310 when the resolution of the image 310 is less than the resolution that can be represented by the light source matrix 320 as the comparison result, and may set image pixels to be displayed in each light source based on the calculated number of light sources.

The light source control apparatus 100 according to an embodiment of the present disclosure may further include an information acquirer 130.

The information acquirer 130 may obtain information about an obstacle in front of the vehicle from a sensor. For example, the sensor may include at least one of a camera, a RADAR, or a LIDAR. As another example, the obstacle in front of the vehicle may include at least one of another vehicle in front of the vehicle or a wall existing in front of the vehicle. As another example, information about the obstacle in front of the vehicle obtained by the information acquirer 130 may include at least one of a distance from the obstacle in front of the vehicle, a type of the obstacle, or a height of the obstacle.

The controller 120 may change the resolution of the image based on the information about the obstacle in front of the vehicle acquired by the information acquirer 130. For example, when there is an obstacle in front of the vehicle, the controller 120 may change the resolution of the image to be lower based on the distance from the obstacle, and may control an operation of the light source matrix such that the light source matrix does not project the image on the obstacle.

In an embodiment, the controller 120 may calculate a distance through which the light source matrix can project an image, based on information about an obstacle in front of the vehicle. For example, the controller 120 may calculate the distance from an obstacle based on information obtained from the sensor, and may calculate the distance at which an image can be projected from the light source matrix based on the calculated distance from the obstacle. In this case, the controller 120 may change the resolution of the image based on the calculated distance at which the image can be projected. For example, the controller 120 may calculate a ratio of a distance at which an image can be projected from the light source matrix when no obstacle exists to a distance at which an image can be projected, which is changed due to the presence of an obstacle, and may change the resolution of the image based on the calculated ratio.

Figure 4:
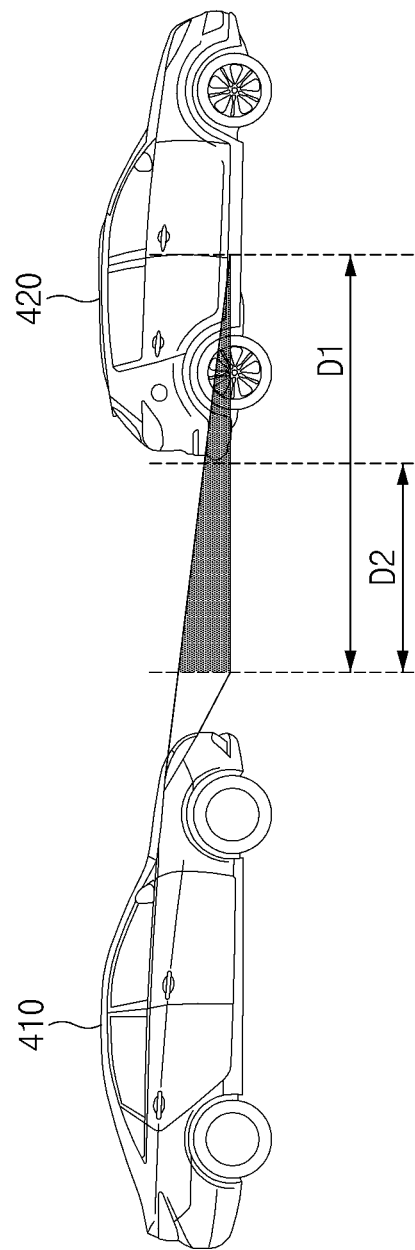
FIG. 4 is a diagram illustrating how a resolution of an image is changed and displayed when there is an obstacle in front of a vehicle in a light source control apparatus, according to an embodiment of the present disclosure.

FIG. 4 is a diagram illustrating an example of changing a resolution of an image by a light source control apparatus when there is an obstacle in front of a vehicle and allowing a light source matrix to display an image, according to an embodiment of the present disclosure.

Referring to FIG. 4, the information acquirer 130 may obtain information about an obstacle in front of a vehicle 410 from a sensor of the vehicle 410. For example, the information acquirer 130 may obtain information about the other vehicle 420 in front of the vehicle 410 from a sensor of the vehicle 410. As another example, the information acquirer 130 may obtain information about the distance between the vehicle 410 and the other vehicle 420.

The controller 120 may change the resolution of the image to be displayed by the light source matrix based on the distance between the vehicle 410 and the other vehicle 420 obtained by the information acquirer 130. For example, the controller 120 may calculate a distance D2 at which the image can be projected from the light source matrix, which is changed due to the presence of the other vehicle 420, and may change the resolution of the image based on the calculated distance.

In an embodiment, the controller 120 may calculate a ratio of a distance D1 at which the image is displayed from the light source matrix when there is no other vehicle 420 to the distance D2 at which the image can be projected from the light source matrix, which is changed due to the presence of the other vehicle 420, and may change the resolution of the image based on the calculated ratio. For example, when the ratio of the distance D1 to the distance D2 is calculated to be 2:1, the controller 120 may change the resolution of the image to be half the horizontal axis and half the vertical axis, and may control an operation of the light source matrix such that the light source matrix displays the image of which resolution is changed.

Referring back to FIG. 1, when there is an obstacle in front of the vehicle, the controller 120 may allow the light source matrix to lower the irradiating angle to avoid the obstacle. For example, when there is an obstacle in front of the vehicle, since the image may be projected on the obstacle and may cause an error in the image, the controller 120 may allow the light source matrix to project an accurate image by lowering the irradiating angle of the light source matrix.

In an embodiment, when it is determined that the obstacle in front of the vehicle is a wall, the controller 120 may allow the light source matrix to project an image on the wall by increasing the irradiating angle of the light source matrix. For example, the controller 120 may determine whether the obstacle in front of the vehicle is a wall, based on information about the distance between the vehicle and the obstacle and information about the height of the obstacle, which are included in the information about the obstacle in front of the vehicle, and when it is determined that the obstacle is the wall, the controller 120 may control an operation of the light source matrix such that an image can be projected on the wall.

Figure 5:
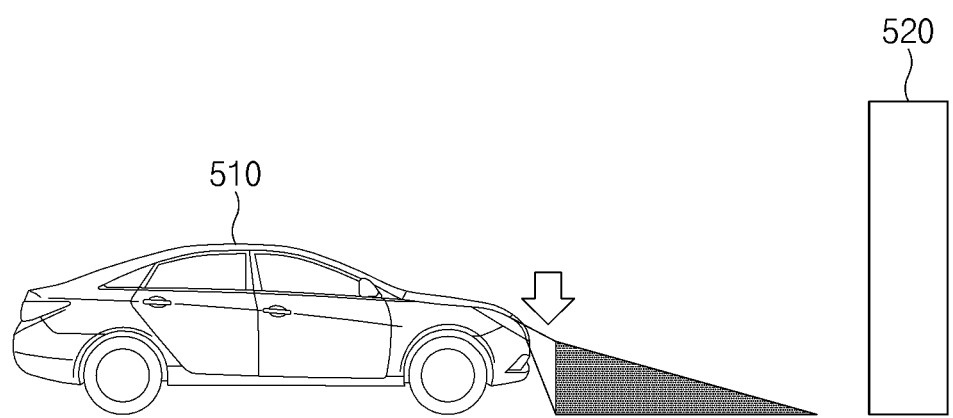
FIGS. 5 and 6 are diagrams illustrating examples of allowing a light source matrix to change an angle at which an image is irradiated when a wall exists in front of a vehicle in a light source control apparatus, according to an embodiment of the present disclosure.
Figure 6:
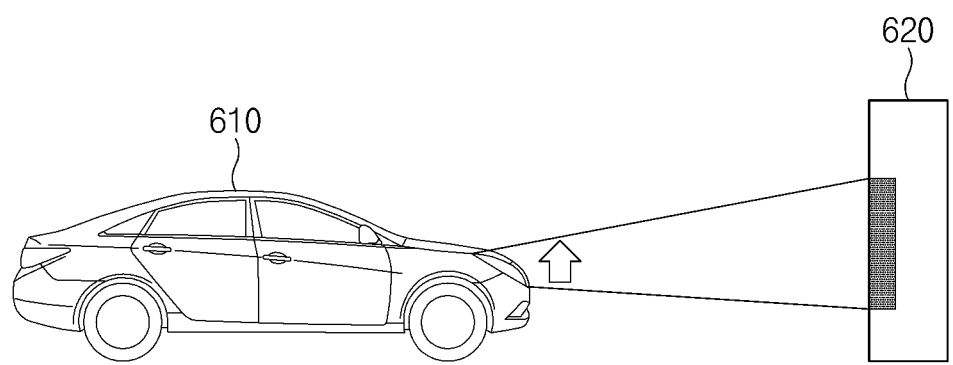

FIGS. 5 and 6 are diagrams illustrating examples of allowing a light source matrix to change an angle at which an image is irradiated when a wall exists in front of a vehicle in a light source control apparatus, according to an embodiment of the present disclosure.

Referring to FIG. 5, the information acquirer 130 may obtain information about an obstacle 520 in front of a vehicle 510. For example, the information acquirer 130 may obtain information about a distance from the obstacle 520 in front of the vehicle 510 and information about a type of the obstacle 520.

The controller 120 may allow the light source matrix to lower the angle at which an image is irradiated when the distance from the obstacle 520 in front of the vehicle 510 is closer than the distance at which the light source matrix can project the image when there is no obstacle. That is, the controller 120 may control the operation of the light source matrix such that an image is not projected on the obstacle 520.

Referring to FIG. 6, the information acquirer 130 may obtain information about an obstacle 620 in front of a vehicle 610. For example, the information acquirer 130 may obtain information about a distance from the obstacle 620 in front of the vehicle 610 and information about a height of the obstacle 620.

The controller 120 may determine whether the obstacle 620 in front of the vehicle 610 is a wall based on the information obtained from the information acquirer 130. For example, when it is determined that the height of the obstacle 620 is equal to or greater than a preset value and the cross-section of the obstacle 620 is flat, the controller 120 may determine that the obstacle 620 is a wall. In this case, the controller 120 may allow the light source matrix to project an image on the obstacle 620 by increasing the irradiating angle of the light source matrix. That is, when the obstacle 620 is a wall, the controller 120 may control the operation of the light source matrix such that an image is projected on the wall by increasing the irradiating angle of the light source matrix.

According to an embodiment, the controller 120 of the light source control apparatus 100 may determine whether a vehicle is in a power saving mode or a standby mode in which the ignition is not turned on. For example, the controller 120 may obtain whether the vehicle is in the power saving mode or the standby mode in which the ignition is not turned on from another device inside the vehicle. As another example, the controller 120 may directly determine whether it is in the power saving mode or the standby mode in which the ignition is not turned on.

When the vehicle is in the power saving mode or the standby mode in which the ignition is not turned on, the controller 120 may lower the resolution of the image, and may allow the light source matrix to display the image having the lowered resolution. For example, when the vehicle is in the standby mode or the power saving mode, since power consumption needs to be reduced, the controller 120 may control the operation of the light source matrix to display an image having a lower resolution.

The light source control apparatus 100 according to an embodiment of the present disclosure may obtain an image to be displayed in the light source matrix through the image acquirer 110, may change the resolution of the image through the controller 120 to allow the light source matrix to output the image having the changed resolution by controlling the operation of the light source matrix, and may provide the user with an accurate image suitable for the resolution that can be displayed by the light source matrix.

The light source control apparatus 100 according to another embodiment of the present disclosure may obtain the presence or absence of an obstacle from a sensor, and may change the resolution of an image depending on the existence of the obstacle and the type of the obstacle, or the irradiating angle of the light source matrix, thereby providing the user with an image in which an error does not occur due to an obstacle.

Figure 7:
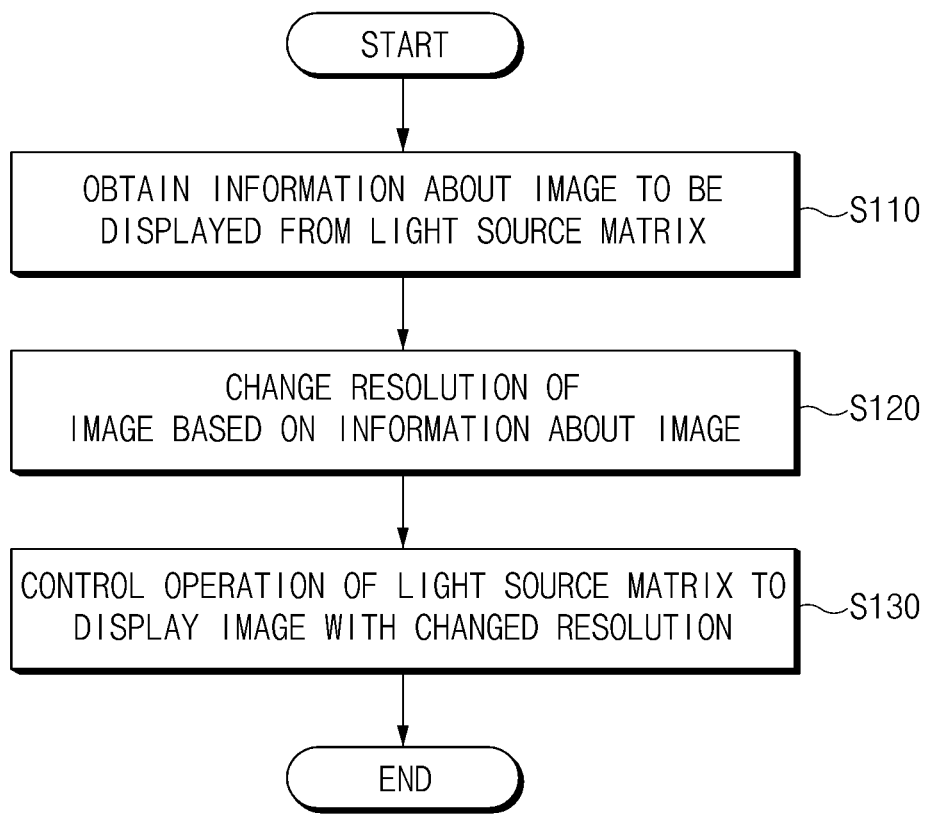
FIG. 7 is a flowchart illustrating a method of operating a light source control apparatus, according to an embodiment of the present disclosure.

FIG. 7 is a flowchart illustrating a method of operating a light source control apparatus, according to an embodiment of the present disclosure.

Referring to FIG. 7, a method of operating the light source control apparatus 100 according to an embodiment of the present disclosure may include obtaining information about an image to be displayed from a light source matrix (S110), changing a resolution of the image based on the information about the image (S120), and controlling an operation of the light source matrix to display the image with the changed resolution (S130).

In operation S110 of obtaining the information about the image to be displayed from the light source matrix, the image acquirer 110 may obtain information about the image to be displayed from the light source matrix. For example, the image acquirer 110 may obtain resolution information of the image to be displayed from the light source matrix. As another example, the image acquirer 110 may obtain at least one of image information, image data, and RGB data of pixels included in an image to be displayed from the light source matrix.

In operation S120 of changing the resolution of the image based on the information about the image, the controller 120 may change the resolution of the image, based on the information about the image obtained by the image acquirer 110. For example, the controller 120 may change to decrease or increase the resolution of the image, based on the obtained resolution information of the image. As another example, the controller 120 may change the resolution of the image based on resolution information of the image and resolution information that can be represented by the light source matrix. In an embodiment, the controller 120 may change the resolution of the image to output an image that matches the size of the light source matrix based on the information about the image obtained in operation S120.

In operation S130 of controlling the operation of the light source matrix to display the image with the changed resolution, the controller 120 may control the operation of the light source matrix to display the image with the changed resolution. For example, the controller 120 may set image information to be displayed by each light source included in the light source matrix, and may control the operation of the light source matrix such that each light source included in the light source matrix displays set image information. As another example, the controller 120 may control the operation of the light source matrix to change the angle at which the image is irradiated by the light source matrix.

Figure 8:
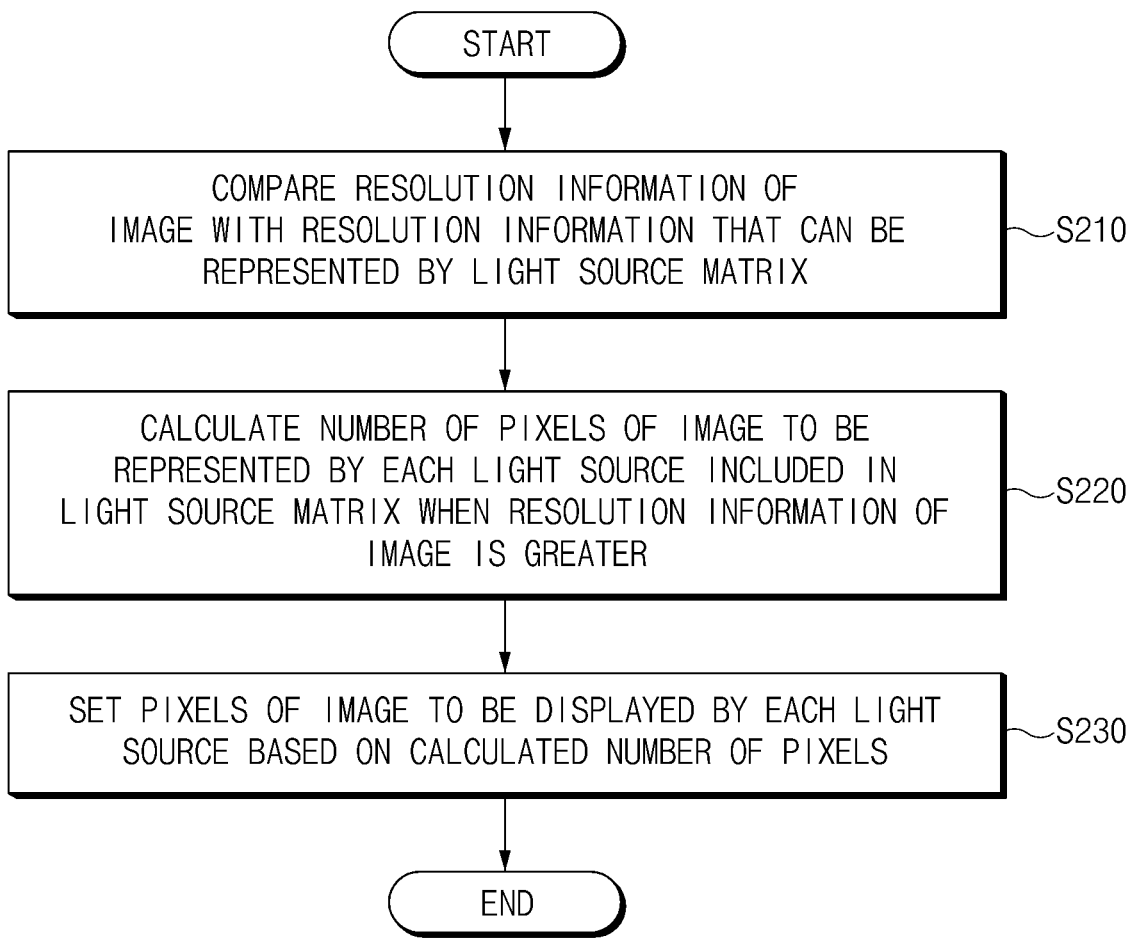
FIGS. 8 and 9 are flowcharts illustrating operation S120 of a method of operating a light source control apparatus, according to an embodiment of the present disclosure.
Figure 9:
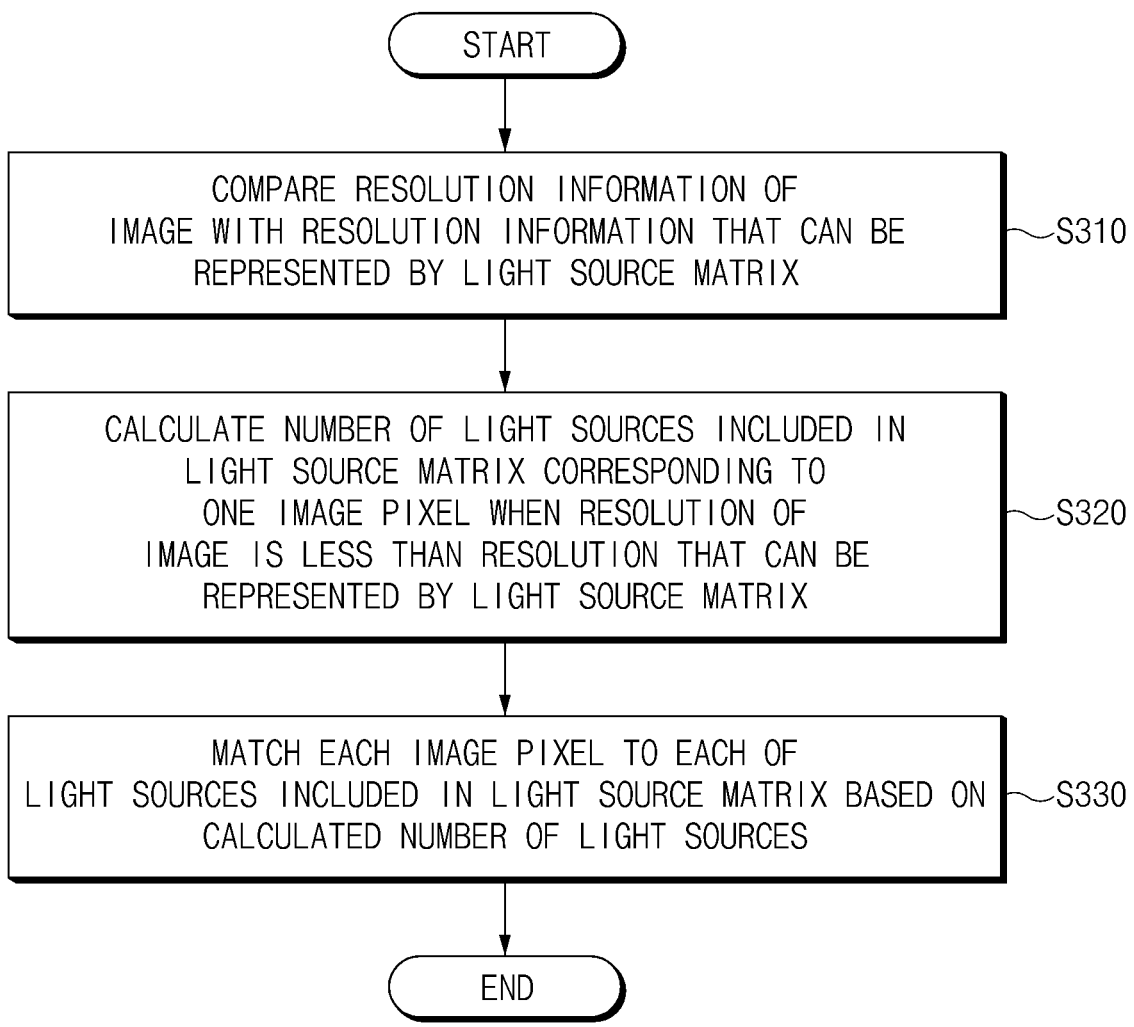

FIGS. 8 and 9 are flowcharts illustrating operation S120 of a method of operating a light source control apparatus, according to an embodiment of the present disclosure.

Referring to FIG. 8, in the operation method of the light source control apparatus 100 according to an embodiment of the present disclosure, operation S120 includes comparing resolution information of an image with resolution information that can be represented by a light source matrix (S210), calculating the number of pixels of the image to be represented by each light source included in the light source matrix when the resolution information of the image is greater than the resolution information that can be represented by the light source matrix (S220), and setting pixels of the image to be displayed by the each light source based on the calculated number of pixels (S230).

In operation S210 of the comparing the resolution information of the image with the resolution information that can be represented by the light source matrix, the controller 120 may compare the resolution information of the image with the resolution information that can be represented by the light source matrix. For example, the controller 120 may compare the horizontal axis size (resolution) information and the vertical axis size (resolution) information of the image that are included in the resolution information of the image with the horizontal axis size (resolution) information and the vertical axis size (resolution) information that can be represented by the light source matrix. According to an embodiment, the controller 120 may determine that the resolution of the image is greater than the resolution information that can be represented by the light source matrix. According to an embodiment, the controller 120 may determine that the resolution of the image is less than the resolution information that can be represented by the light source matrix.

When the resolution of the image is greater than the resolution information that can be represented by the light source matrix, in operation S220 of calculating the number of pixels of the image to be represented by the each light source included in the light source matrix, the controller 120 may calculate the number of image pixels to be represented by the each light source included in the light source matrix when the resolution of the image is greater than the resolution information that can be represented by the light source matrix. For example, the controller 120 may divide the horizontal axis size of the image information by the horizontal axis size of the light source matrix, and may divide the vertical axis size of the image information by the vertical axis size of the light source matrix to calculate the number of pixels of the image to be represented by each light source included in the light source matrix. In an embodiment, when the resolution of the image is 15*8 and the resolution that can be represented by the light source matrix is 5*4, the controller 120 may calculate that each light source included in the light source matrix should represent pixels of the image having a size of 3*2.

In operation S230 of setting the pixels of the image to be displayed by each light source based on the calculated number of pixels, the controller 120 may set the pixels of the image to be displayed by each light source, based on the calculated number of image pixels to be represented by each light source included in the light source matrix. For example, when the number of image pixels to be represented by each light source included in the light source matrix is 3*2, the controller 120 may set each of six image pixels to correspond to each light source.

In an embodiment, when the number of image pixels set for one light source is plural, the controller 120 may allow the light source to display an average value of image information of the image pixels. For example, the average value of image information of the image pixels may include an average value of RGB data of the image pixels.

Referring to FIG. 9, in the operation method of the light source control apparatus 100 according to an embodiment of the present disclosure, operation S120 may include comparing resolution information of an image with resolution information that can be represented by a light source matrix (S310), calculating the number of light sources included in the light source matrix corresponding to one image pixel when the resolution of the image is less than the resolution that can be represented by the light source matrix (S320), and matching each image pixel to each of the light sources included in the light source matrix based on the calculated number of light sources (S330).

In operation S310 of the comparing the resolution information of the image with the resolution information that can be represented by the light source matrix, the controller 120 may compare the resolution information of the image with the resolution information that can be represented by the light source matrix. For example, operation S310 may be actually the same as operation S210 of FIG. 7.

When the resolution of the image is less than the resolution that can be represented by the light source matrix, in operation S320 of calculating the number of light sources included in the light source matrix corresponding to one image pixel, the controller 120 may calculate the number of light sources included in the light source matrix corresponding to one image pixel when the resolution of the image is less than the resolution information that can be represented by the light source matrix. For example, the controller 120 may divide the horizontal axis size of the light source matrix by the horizontal axis size of the image resolution, and may divide the vertical axis size of the light source matrix by the vertical axis size of the image resolution, such that the number of light sources included in the light source matrix corresponding to one image pixel may be calculated. In an embodiment, when the resolution of the image is 5*4 and the resolution that can be represented in the light source matrix is 15*8, the controller 120 may calculate that a size of 3*2 of the light sources included in the light source matrix corresponds to one image pixel.

In operation S330 of matching each image pixel with each light source included in the light source matrix based on the calculated number of light sources, the controller 120 may match each image pixel to each light source included in the light source matrix based on the calculated number of corresponding light sources per image pixel. For example, the controller 120 may correspond each of the six light sources to one image pixel when a size of 3*2 of the light sources included in the light source matrix corresponds to each image pixel.

In an embodiment, the controller 120 may control the operation of the light source matrix such that each of the light sources corresponding to each image pixel displays the image information of the image pixel.

Figure 10:
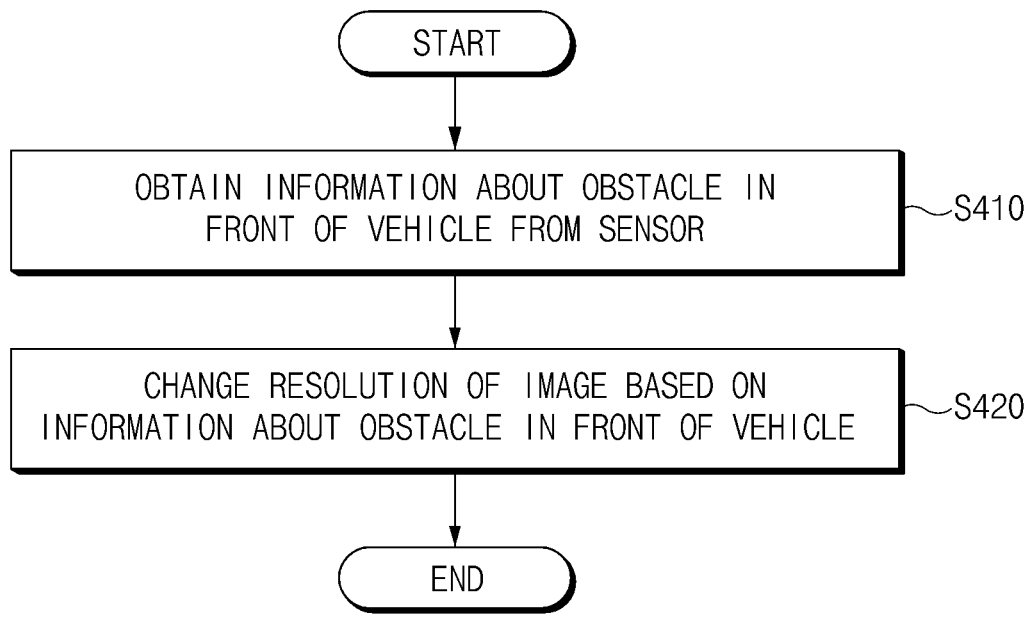
FIGS. 10 and 11 are flowcharts illustrating in more detail a method of operating a light source control apparatus, according to an embodiment of the present disclosure.
Figure 11:
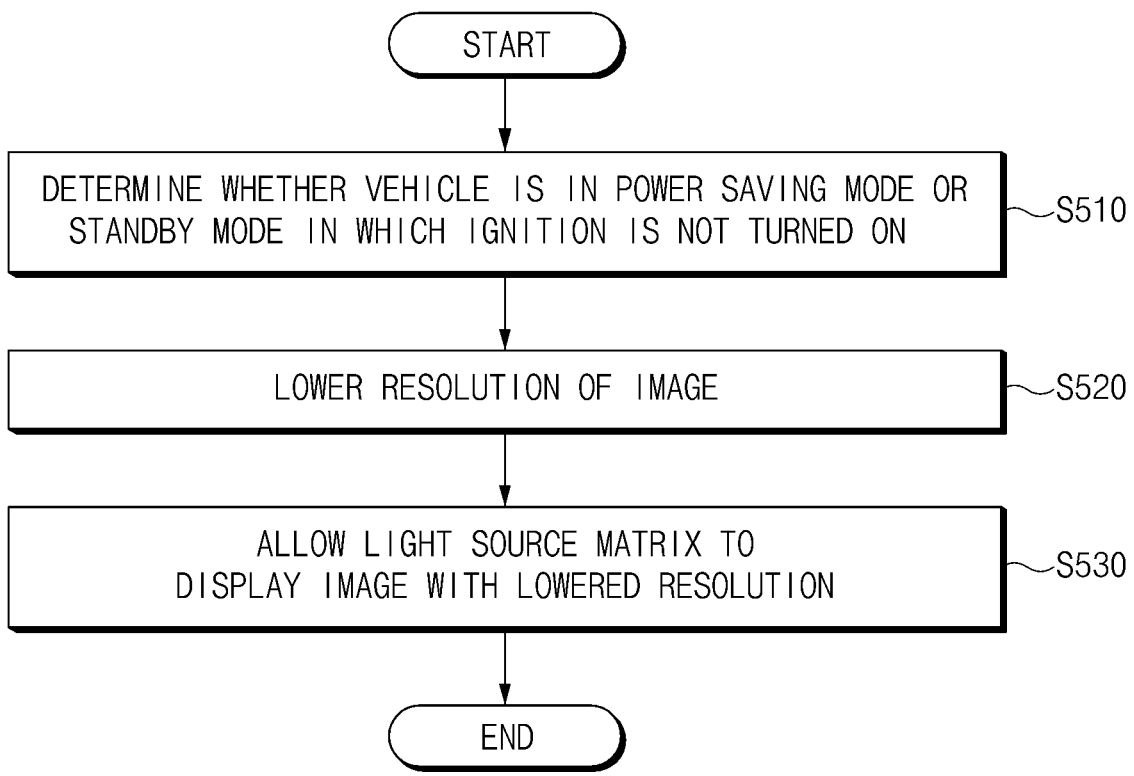

FIGS. 10 and 11 are flowcharts illustrating in more detail a method of operating a light source control apparatus, according to an embodiment of the present disclosure.

A method of operating the light source control apparatus 100 according to an embodiment of the present disclosure may further include obtaining information about an obstacle in front of a vehicle from a sensor (S410) and changing resolution of the image based on the information about the obstacle in front of the vehicle (S420).

In operation S410 of obtaining the information about the obstacle in front of the vehicle from the sensor, the information acquirer 130 may obtain information about the obstacle in front of the vehicle from the sensor. For example, the information about the obstacle in front of the vehicle may include at least one of the presence of an obstacle in front of the vehicle, a size of the obstacle, a distance from the obstacle, a height of the obstacle, flat information of the cross-section of the obstacle, and a type of the obstacle.

In operation S420 of changing the resolution of the image based on the information about the obstacle in front of the vehicle, the controller 120 may change the resolution of the image based on the information about the obstacle. For example, when a distance through which an image can be projected is shortened due to the presence of an obstacle, the controller 120 may lower the resolution of the image, and may allow the light source matrix to display the image having the lowered resolution. In an embodiment, the controller 120 may obtain information about the distance from the obstacle in front of the vehicle, may compare the distance from the obstacle with the distance at which the image can be projected by the light source matrix when the obstacle does not exist to calculate a ratio, and may change the resolution of the image based on the calculated ratio.

In an embodiment, the method of operating the light source control apparatus 100 may further include allowing an angle at which the image is irradiated by the light source matrix to be lowered while avoiding the obstacle when there is the obstacle in front of the vehicle. For example, when there is an obstacle in front of the vehicle, the controller 120 may compare the distance from the obstacle with a preset value. In this case, when the distance from the obstacle is closer than the preset value, the controller 120 may allow the angle at which the image is irradiated by the light source matrix to be lowered and may control the operation of the light source matrix such that the image is projected while avoiding the obstacle.

In an embodiment, the method of operating the light source control apparatus 100 may further include allowing the light source matrix to project the image on a wall by increasing an angle at which the image is irradiated by the light source matrix when it is determined that the obstacle is the wall. For example, the controller 120 may determine whether the obstacle is a wall, and when it is determined that the obstacle is the wall, the controller 120 may control the operation of the light source matrix to project the image on the wall by increasing the irradiating angle of the light source matrix.

Referring to FIG. 11, a method of operating the light source control apparatus 100 according to an embodiment of the present disclosure may further include determining whether a vehicle is in a power saving mode or a standby mode in which the ignition is not turned on (S510), lowering resolution of the image (S520), and allowing the light source matrix to display the image with the lowered resolution (S530).

In operation S510 of determining whether the vehicle is in the power saving mode or the standby mode in which the ignition is not turned on, the controller 120 may determine whether the vehicle is in the power saving mode or the standby mode.

In operation S520 of lowering the resolution of the image, the controller 120 may lower the resolution of the image when the vehicle is in the power saving mode or the standby mode. For example, since there is a need to reduce power consumption when the vehicle is in power saving mode or standby mode, the controller 120 may lower the resolution of the image. As another example, the controller 120 may lower the resolution of the image depending on a preset ratio.

In operation S530 of allowing the light source matrix to display the image having the lower resolution, the controller 120 may allow the light source matrix to display the image having the lower resolution.

Figure 12:
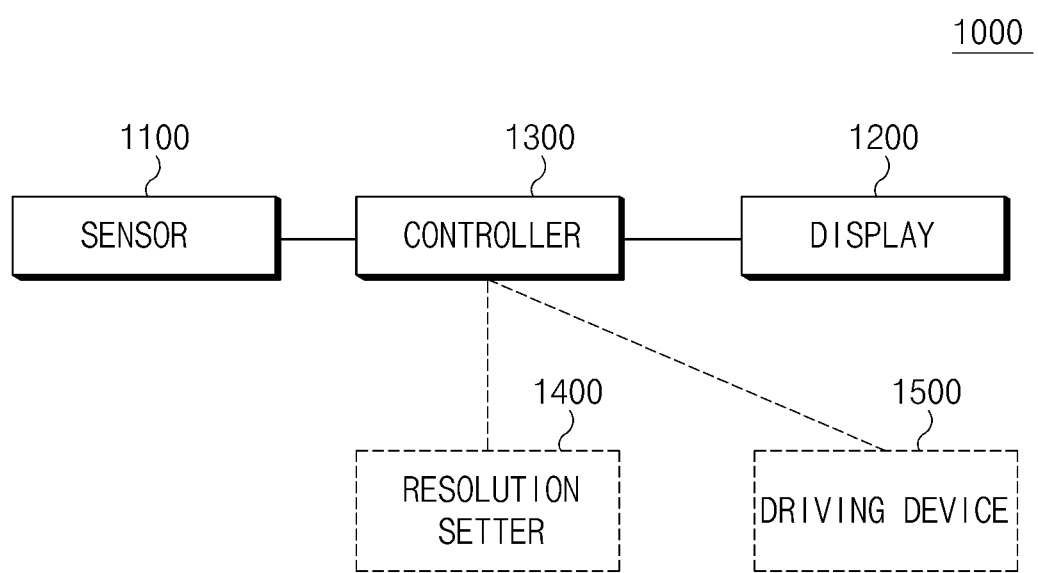
FIG. 12 is a block diagram illustrating a lamp, according to an embodiment of the present disclosure.

FIG. 12 is a block diagram illustrating a lamp, according to an embodiment of the present disclosure.

Referring to FIG. 12, a lamp 1000 according to an embodiment of the present disclosure may include a sensor 1100, a display 1200, and a controller 1300. According to an embodiment, the lamp 1000 may further include a resolution setter 1400. According to another embodiment, the lamp 1000 may further include a driving device 1500. According to another embodiment, the lamp 1000 may further include the resolution setter 1400 and the driving device 1500.

The sensor 1100 may sense an object in front of the vehicle. For example, the sensor 1100 may sense whether a wall surface in front of the vehicle exists. In an embodiment, the sensor 1100 may include a distance sensing sensor or a camera. For example, the distance sensing sensor may include at least one of a lidar sensor, a radar sensor, an infrared (IR) sensor, and a time of flight (ToF) sensor.

The display 1200 may display an image. For example, the display 1200 may display an image processed by the controller 1300 or the resolution setter 1400. As another example, the display 1200 may include a high-resolution LED.

The controller 1300 may determine a first area in front of the vehicle to project an image based on the object sensed by the sensor 1100. For example, when a wall surface is sensed in front of the vehicle, the controller 1300 may determine the wall surface as the first area. As another example, when an object in front of the vehicle is not sensed, the controller 1300 may determine a bottom surface as the first area.

The controller 1300 may set a second area (or a portion) of the display 1200, at which the display 1200 displays (or projects) an image corresponding to the determined first area. For example, when the first area is a wall surface, the controller 1300 may set the second area to an upper area of the display 1200. As another example, when the first area is a bottom surface, the controller 1300 may set the second area to a lower area of the display 1200.

When the first area is a wall surface, the controller 1300 may set the second area to display an image on the wall surface. Also, when the first area is a wall surface, the controller 1300 may set the second area based on a distance between the wall surface and the vehicle.

When the first area is a bottom surface, the controller 1300 may set the second area to display an image on the bottom surface.

The lamp 1000 according to an embodiment of the present disclosure may further include the resolution setter 1400. In FIG. 12, the resolution setter 1400 and the controller 1300 are illustrated as separate components, but the present disclosure is not limited thereto, and an operation of the resolution setter 1400 may be performed by the controller 1300.

The resolution setter 1400 may set resolution of the image to correspond to the set size of the second area. For example, when the resolution of the image is equal to or greater than the number of pixels of the second area of the display 1200, the resolution setter 1400 may reduce the resolution of the image to correspond to the number of pixels. For example, when the resolution of the image is less than the number of pixels of the second area of the display 1200, the resolution setter 1400 may increase the resolution of the image to correspond to the number of pixels.

The lamp 1000 according to an embodiment of the present disclosure may further include the driving device 1500. For example, the driving device 1500 may adjust the angle that is projected by the display 1200. As another example, the driving device 1500 may be controlled by the controller 1300.

The controller 1300 may identify the resolution of the image, and when the resolution of the image is equal to or greater than the number of pixels of the display 1200, the controller 1300 may control the driving device 1500 such that the image is displayed on all areas of the display 1200. For example, the controller 1300 may control the driving device 1500 to allow the display 1200 to be leveled upward. As another example, the controller 1300 may control the driving device 1500 to allow the display 1200 to be auto-leveled.

According to an embodiment, the controller 1300 may determine whether to adjust the area displayed by the display 1200 by controlling the driving device 1500 based on the resolution of the image or to allow the display 1200 to display the image having a changed resolution by allowing the resolution setter 1400 to set the resolution of the image.

The lamp 1000 according to an embodiment of the present disclosure may recognize a projection surface of an image and may allow the image to be accurately displayed on the recognized projection surface of the image.

The lamp 1000 according to an embodiment of the present disclosure may allow the image to be accurately displayed on the projection surface (the first area) of the image by changing the resolution of the image.

The lamp 1000 according to the embodiment of the present disclosure may allow the image to be accurately displayed on the projection surface (the first area) of the image through auto-leveling of the lamp 1000.

The lamp 1000 according to an embodiment of the present disclosure may determine whether to change the resolution of an image or to perform auto-leveling based on the resolution of the image, thereby allowing the image to be accurately displayed on the projection surface (the first area) of the image.

Figure 13:
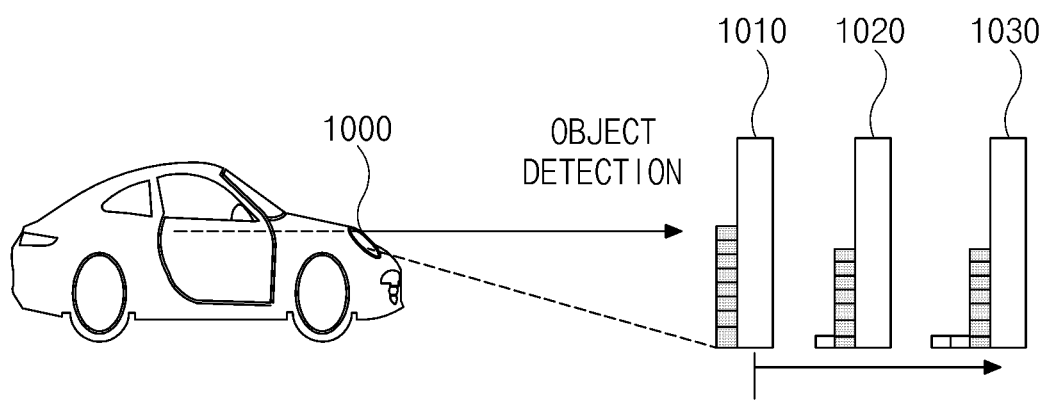
FIG. 13 is a diagram illustrating an example in which a lamp detects an object in front of a vehicle, according to an embodiment of the present disclosure.

FIG. 13 is a diagram illustrating an example in which a lamp detects an object in front of a vehicle, according to an embodiment of the present disclosure. The lamp 1000 of FIG. 13 may be actually the same as the lamp 1000 of FIG. 12.

Referring to FIG. 13, the lamp 1000 may detect objects 1010, 1020, and 1030 in front of the vehicle through the sensor 1100. For example, when the objects 1010, 1020, and 1030 in front of the vehicle are detected through the sensor 1100, the controller 1300 may determine the first area as the objects 1010, 1020, and 1030 in front of the vehicle. For example, the objects 1010, 1020, and 1030 in front of the vehicle may be a wall surface.

The controller 1300 may set the second area in which the display 1200 displays an image based on distances from the objects 1010, 1020, and 1030 in front of the vehicle. For example, when the first object 1010 is detected, since the display 1200 may display the entire image on the first object 1010, the controller 1300 may set the second area as the entire area of the display 1200. As another example, when the second object 1020 or the third object 1030 is detected, since the display 1200 cannot display the entire image on the second object 1020 or the third object 1030, the controller 1300 may set a partial area of the display 1200 as the second area. In an embodiment, the controller 1300 may set a portion of the upper area of the display 1200 as the second area.

Figure 14:
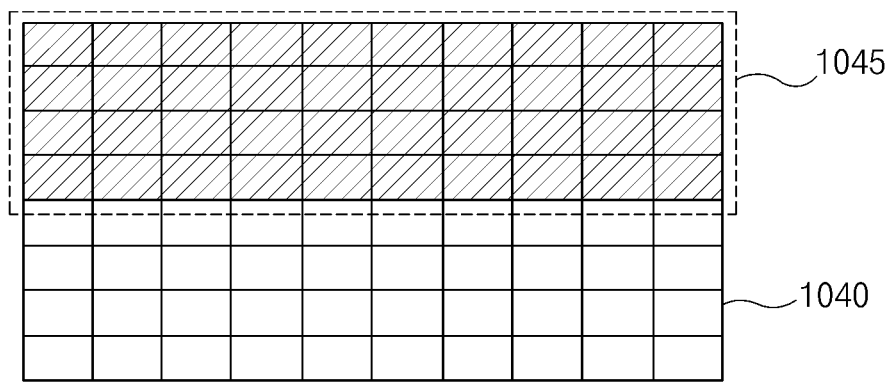
FIG. 14 is a diagram illustrating an example of setting an area in which a lamp displays an image, according to an embodiment of the present disclosure.

FIG. 14 is a diagram illustrating an example of setting an area in which a lamp displays an image, according to an embodiment of the present disclosure.

Referring to FIG. 14, the controller 1300 may set some pixels 1045 among all pixels 1040 as the second area. For example, the display 1200 may include all pixels 1040, and the controller 1300 may set only some pixels 1045 of all pixels 1040 as the second area for displaying an image. When some pixels 1045 are set as the second area, the display 1200 may display an image with only some pixels 1045.

Although some pixels 1045 are illustrated as being lesser than all pixels 1040 in FIG. 14, the present disclosure is not limited thereto. That is, some pixels 1045 may include the same pixels as all pixels 1040, or may include some pixels lesser than all pixels 1040.

According to an embodiment, when an object in front of the vehicle is sensed by the sensor 1100, the controller 1300 may set the second area on the upper area of the display 1200. For example, when an object is sensed, since the image displayed by the bottom area of the display 1200 may not reach the object due to the distance between the vehicle and the object, the controller 1300 may set the upper area of the display 1200 as the second area.

In an embodiment, when the second area is set, the resolution setter 1400 may set the resolution of the image to correspond to the size of the second area. For example, the resolution setter 1400 may obtain the horizontal number and the vertical number of pixels included in the second area, and may set the resolution of the image based on the horizontal number and the vertical number.

When the resolution of the image is set, the controller 1300 may control the display 1200 such that the image for which the resolution is set is displayed on the second area of the display 1200.

Figure 15:
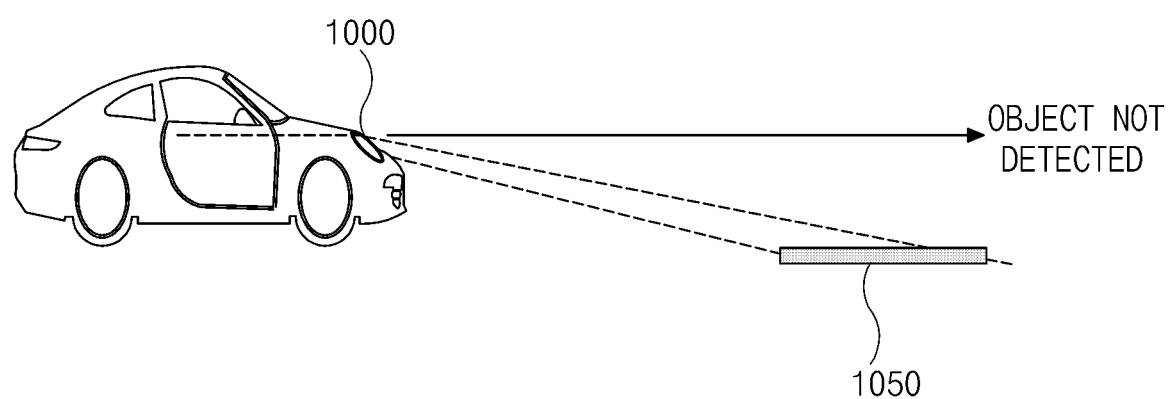
FIG. 15 is a diagram illustrating an example in which a lamp does not detect an object in front of a vehicle, according to an embodiment of the present disclosure.

FIG. 15 is a diagram illustrating an example in which a lamp does not detect an object in front of a vehicle, according to an embodiment of the present disclosure. The lamp 1000 of FIG. 15 may be actually the same as the lamp 1000 of FIG. 12.

Referring to FIG. 15, the lamp 1000 may perform to detect an object in front of the vehicle through the sensor 1100. When the sensor 1100 does not sense an object in front of the vehicle, the controller 1300 may determine the first area to project an image as a bottom surface 1050.

The controller 1300 may set pixels capable of providing light to the bottom surface 1050 among pixels of the display 1200 as the second area. For example, since light from an upper area of the display 1200 may not reach the bottom surface 1050 and light from a lower area of the display 1200 may reach the bottom surface 1050, the controller 1300 may set the lower area of the display 1200 as the second area.

Figure 16:
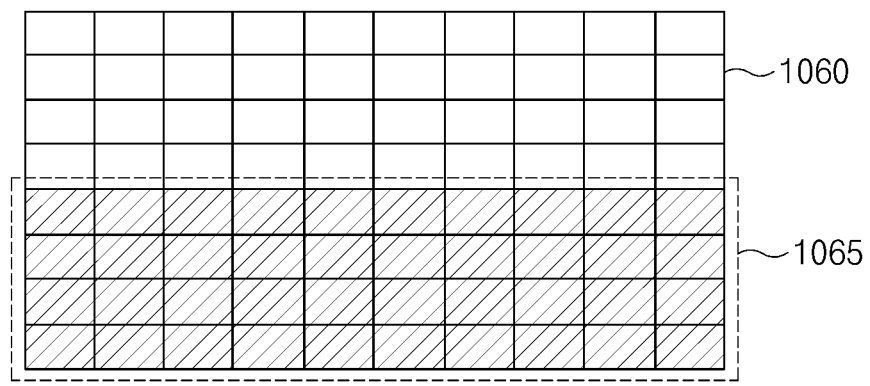
FIG. 16 is a diagram illustrating an example of setting an area in which a lamp displays an image, according to an embodiment of the present disclosure.

FIG. 16 is a diagram illustrating an example of setting an area in which a lamp displays an image, according to an embodiment of the present disclosure.

Referring to FIG. 16, the controller 1300 may set some pixels 1065 among all pixels 1060 as the second area. For example, the display 1200 may include all pixels 1060, and the controller 1300 may set only some pixels 1065 of all pixels 1060 as the second area for displaying an image. When some pixels 1065 are set as the second area, the display 1200 may display an image with only some pixels 1065.

Although some pixels 1065 are illustrated as being smaller than all pixels 1060 in FIG. 16, the present disclosure is not limited thereto. That is, some pixels 1065 may include the same pixels as all pixels 1060, or may include some pixels lesser than all pixels 1060.

According to an embodiment, when an object in front of the vehicle is not sensed by the sensor 1100, the controller 1300 may set the second area on the lower area of the display 1200. For example, when an object is not sensed, since the image displayed by the upper area of the display 1200 may not reach the bottom surface, the controller 1300 may set the lower area of the display 1200 as the second area.

In an embodiment, when the first area is a bottom surface, the second area may be a low beam area of the display 1200.

In an embodiment, when the second area is set, the resolution setter 1400 may set the resolution of the image to correspond to the size of the second area. For example, the resolution setter 1400 may obtain the horizontal number and the vertical number of pixels included in the second area, and may set the resolution of the image based on the horizontal number and the vertical number.

When the resolution of the image is set, the controller 1300 may control the display 1200 such that the image for which the resolution is set is displayed on the second area of the display 1200.

Figure 17:
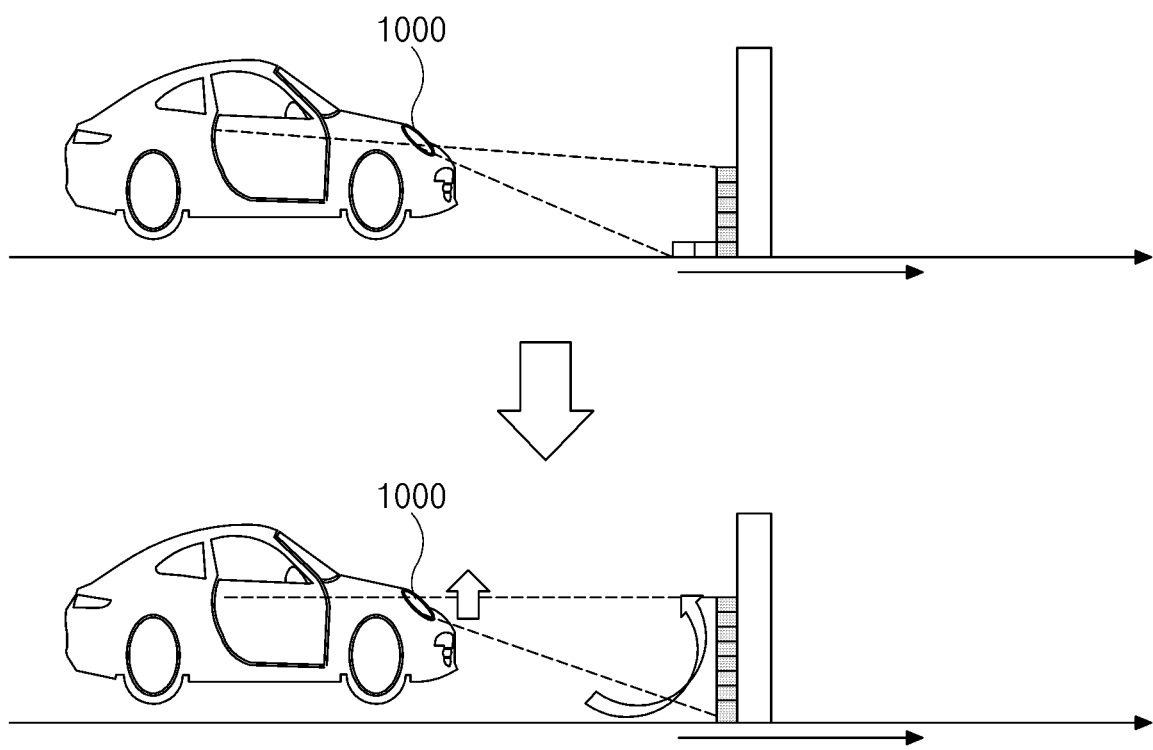
FIG. 17 is a diagram illustrating an example in which a lamp performs an auto-leveling, according to an embodiment of the present disclosure.

FIG. 17 is a diagram illustrating an example in which a lamp performs an auto-leveling, according to an embodiment of the present disclosure. The lamp 1000 of FIG. 17 may be actually the same as the lamp 1000 of FIG. 12.

Referring to FIG. 17, when the lamp 1000 detects an object through the sensor 1100, the lamp 1000 may obtain a distance from the object. The controller 1300 may calculate an area in which an image is displayed on the object based on the distance from the object.

The driving device 1500 of the lamp 1000 may adjust the angle that is projected by the display 1200. For example, the controller 1300 may control the driving device 1500 to adjust the angle that is projected by the display 1200.

The controller 1300 may control the driving device 1500 to display the entire image on the object based on an area where an image is displayed, which is calculated based on the distance to the object. For example, the controller 1300 may control the driving device 1500 to perform the auto leveling.

According to an embodiment, the controller 1300 may obtain the rotation radius of the driving device 1500 in advance. Based on the rotation radius of the driving device 1500, the controller 1300 may control the driving device 1500 to determine whether the entire image can be displayed on the object. For example, when the entire image can be displayed on the object by controlling the driving device 1500, the controller 1300 may control the driving device 1500 to adjust the projection area (the first area) of the display 1200. As another example, when the entire image cannot be displayed on the object by controlling the driving device 1500, the controller 1300 may allow the resolution setter 1400 to display the image whose resolution is set through the display 1200. In an embodiment, the entire image cannot be displayed on the object by controlling the driving device 1500, but when the resolution of the image is high, the controller 1300 may adjust the driving device 1500 to the maximum to allow the display area (the second area) of the image to be set as large as possible, may obtain an image whose resolution is set to correspond to the second area set as large as possible from the resolution setter 1400, and may allow the obtained image to be displayed through the display 1200.

Figure 18:
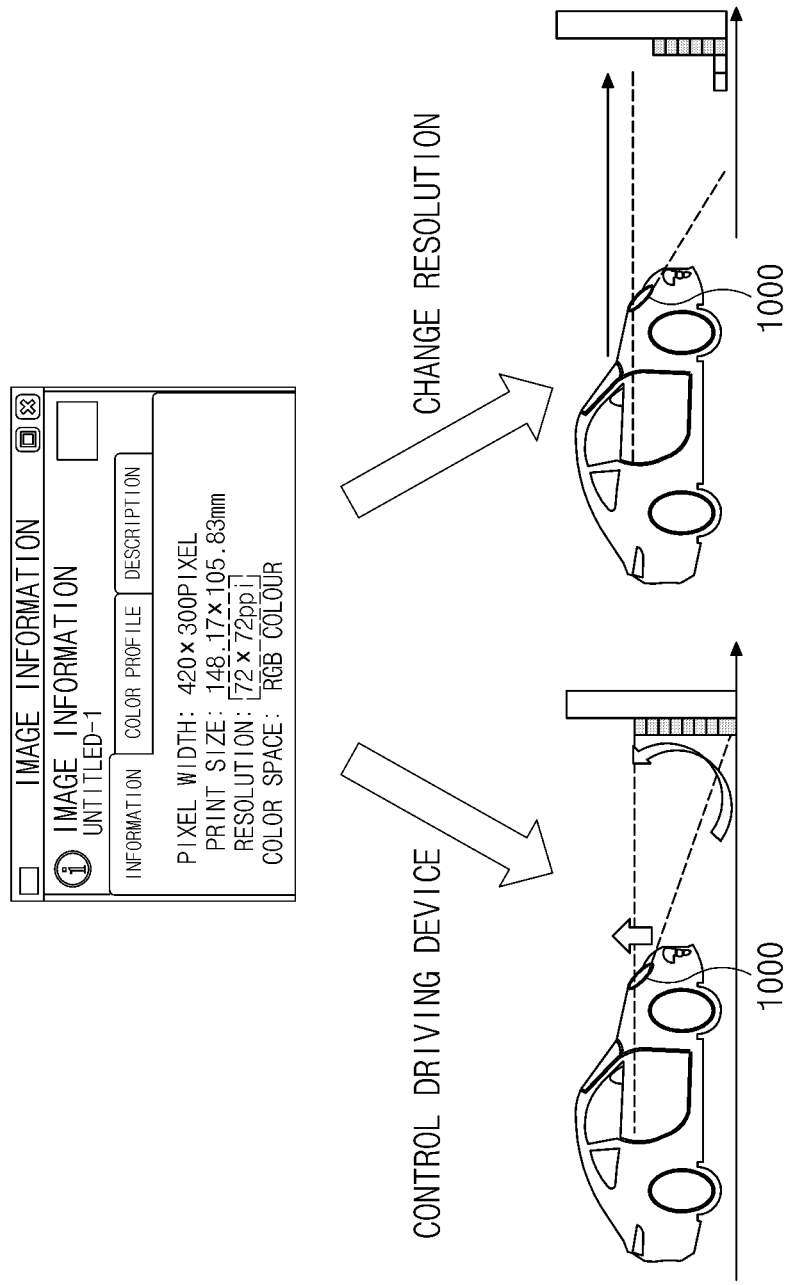
FIG. 18 is a diagram illustrating an example in which a lamp performs an auto-leveling or changes a resolution depending on an image resolution, according to an embodiment of the present disclosure.

FIG. 18 is a diagram illustrating an example in which a lamp performs an auto-leveling or changes a resolution depending on an image resolution, according to an embodiment of the present disclosure. The lamp 1000 of FIG. 18 may be actually the same as the lamp 1000 of FIG. 12.

Referring to FIG. 18, the controller 1300 of the lamp 1000 may identify the resolution of the image. For example, the controller 1300 may identify the resolution of the image from information of an image file.

The controller 1300 may determine whether to set (change) the resolution of the image through the resolution setter 1400 or to control the driving device 1500, based on the identified resolution of the image.

In an embodiment, when the resolution of the image is less than the number of pixels in the second area of the display 1200, the controller 1300 may increase the resolution of the image through the resolution setter 1400 to correspond to the number of pixels in the second area of the display 1200.

In an embodiment, when the resolution of the image is equal to or greater than the number of pixels in the second area of the display 1200, the controller 1300 may decrease the resolution of the image through the resolution setter 1400 to correspond to the number of pixels in the second area.

In an embodiment, when the resolution of the image is equal to or greater than the number of pixels of the display 1200, the controller 1300 may control the driving device 1500 such that all areas of the display 1200 display the image. For example, the controller 1300 may control the driving device 1500 such that all areas of the display 1200 become the second area.

Figure 19:
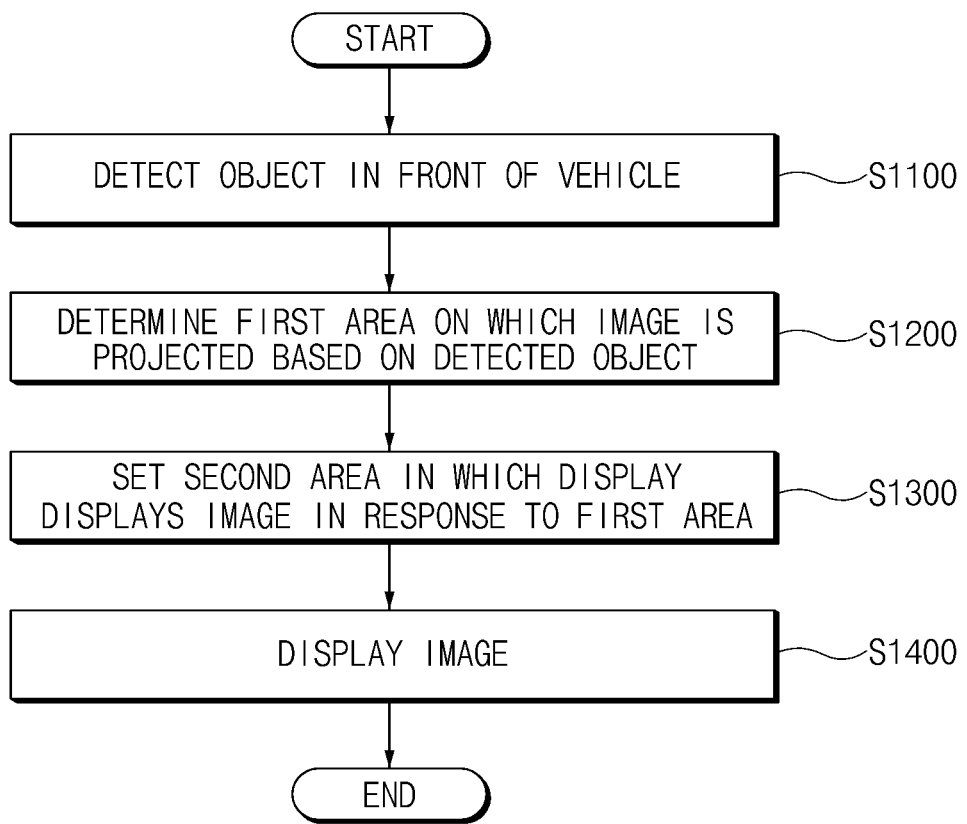
FIG. 19 is a flowchart illustrating a method of operating a lamp, according to an embodiment of the present disclosure.

FIG. 19 is a flowchart illustrating a method of operating a lamp, according to an embodiment of the present disclosure.

Referring to FIG. 19, the operation method of the lamp 1000 according to an embodiment of the present disclosure may include detecting an object in front of a vehicle (S1100), determining a first area on which an image is projected based on the detected object (S1200), setting a second area in which the display displays the image corresponding to the first area (S1300), and displaying the image (S1400). In an embodiment, the lamp 1000 of FIG. 19 may be actually the same as the lamp 1000 of FIG. 12.

In operation S1100 of detecting the object in front of the vehicle, the sensor 1100 may sense the object in front of the vehicle. For example, the sensor 1100 may sense whether a wall surface in front of the vehicle exists. In an embodiment, the sensor 1100 may include a distance sensing sensor or a camera. For example, the distance sensing sensor may include at least one of a lidar sensor, a radar sensor, an infrared (IR) sensor, and a time of flight (ToF) sensor.

In operation S1200 of determining the first area on which the image is projected based on the detected object, the controller 1300 may determine the first area on which the image is projected based on the detected object. For example, when the sensed object is a wall surface, the controller 1300 may determine the first area as the wall surface. As another example, when the sensed object does not exist, the controller 1300 may determine the first area as a bottom surface.

In operation S1300 of setting the second area in which the display displays the image corresponding to the first area, the controller 1300 may set the second area in which the display 1200 displays the image based on the determined first area. For example, when the first area is a wall surface, the controller 1300 may set the second area to display an image on the wall surface. As another example, when the first area is a wall surface, the controller 1300 may set the second area based on a distance between the wall surface and the vehicle. As another example, when the first area is a bottom surface, the controller 1300 may set the second area to display an image on the bottom surface.

In operation S1400 of displaying the image, the display 1200 may display the image. For example, the controller 1300 may allow the display 1200 to display an image in the set second area.

Figure 20:
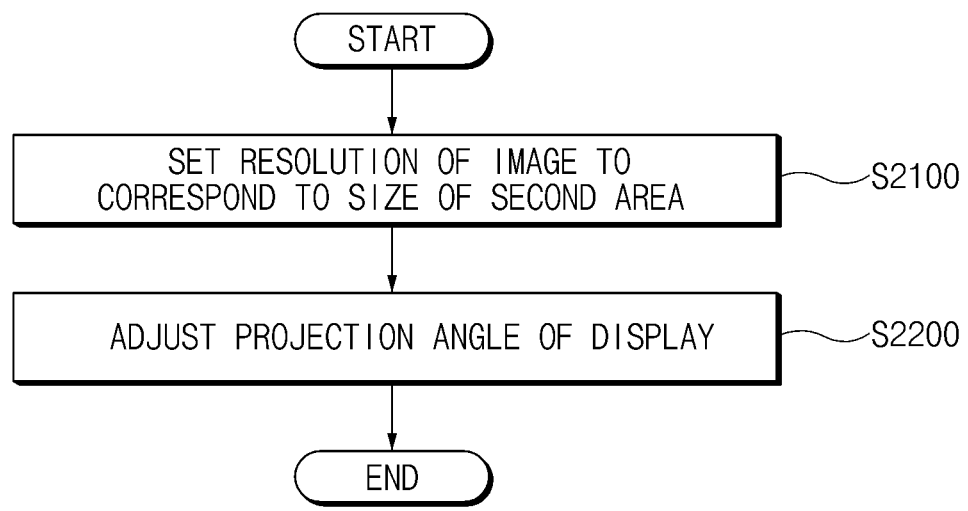
FIG. 20 is a flowchart illustrating in more detail a method of operating a lamp, according to an embodiment of the present disclosure.

FIG. 20 is a flowchart illustrating in more detail a method of operating a lamp, according to an embodiment of the present disclosure.

Referring to FIG. 20, an operation method of the lamp 1000 of the present disclosure may further include setting resolution of the image to correspond to a size of a second area (S2100) and adjusting a projection angle of the display (S2200). In FIG. 20, both operations S2100 and S2200 are illustrated to be performed, but the present disclosure is not limited thereto, and only operation S2100 may be performed, only operation S2200 may be performed, or both operations S2100 and S2200 may not be performed.

In operation S2100 of setting the resolution of the image to correspond to the size of the second area, the resolution setter 1400 may set the resolution of the image to correspond to the size of the second area set by the controller 1300. For example, when the resolution of the image is equal to or greater than the number of pixels of the second area of the display 1200, the resolution setter 1400 may decrease the resolution of the image to correspond to the number of pixels. As another example, when the resolution of the image is less than the number of pixels of the second area of the display 1200, the resolution setter 1400 may increase the resolution of the image to correspond to the number of pixels. In an embodiment, operation S2100 may be performed after operation S1300 of FIG. 19.

In operation S2200 of adjusting the project angle of the display, the controller 1300 may control the driving device 1500 to adjust the projection angle of the display 1200. For example, the controller 1300 may control the driving device 1500 to adjust the projection angle of the display 1200 such that the entire area of the display 1200 becomes the second area. In an embodiment, operation S2200 may be performed after operation S1300 of FIG. 19.

According to an embodiment of the present disclosure, a light source control apparatus may obtain an image to be displayed from a light source matrix, may change the resolution of the obtained image, and may control an operation of the light source matrix to display the image with the changed resolution.

According to an embodiment of the present disclosure, a light source control apparatus may obtain information about an obstacle in front of a vehicle, may change the resolution of the image based on the information about the obstacle, and may control an operation of the light source matrix such that a projection angle of the image is changed and displayed.

According to an embodiment of the present disclosure, a lamp may recognize a projection surface of an image and allow the image to be accurately displayed on the recognized projection surface.

According to an embodiment of the present disclosure, a ramp may allow an image to be displayed accurately on a projection surface of the image by changing the resolution of the image.

According to an embodiment of the present disclosure, a lamp may allow an image to be displayed accurately on the projection surface of the image through an auto-leveling of the lamp.

According to an embodiment of the present disclosure, a ramp may allow an image to be displayed accurately on the projection surface of the image by determining whether to change the resolution of the image or to perform an auto-leveling, based on the resolution of the image.

In addition, various effects directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A light source control apparatus comprising:
    an image acquirer configured to receive image information of an image to be projected by a light source matrix comprising a plurality of light sources, the image information of the image including a first resolution of the image; and
    a controller configured to change the first resolution of the image to a second resolution of the light source matrix based on the received image information and control the light source matrix to project the image having the second resolution,
    wherein, to change the first resolution of the image to the second resolution, the controller is configured to:
        compare the first resolution of the image with the second resolution of the light source matrix; and
        calculate a number of pixels of the image to be projected by each light source when the first resolution of the image is greater than the second resolution of the light source matrix.

2. The light source control apparatus of claim 1, wherein the controller is configured to select, based on the calculated number of pixels to be displayed by each light source, the pixels of the image to be projected by each light source.

3. The light source control apparatus of claim 2, wherein:
    the plurality of light sources includes a first light source, and
    the controller is configured to:
        determine that the calculated number of the pixels to be projected by the first light source is two or more;
        calculate an average of image values of the two or more pixels; and
        control the first light source to project the average of the image values of the two or more pixels.

4. The light source control apparatus of claim 1, wherein the controller is configured to calculate a number of the light sources corresponding to each pixel of the image when the first resolution of the image is less than the second resolution of the light source matrix.

5. The light source control apparatus of claim 4, wherein the controller is configured to:
    match each pixel of the image to each light source based on the calculated number of the light sources corresponding to each pixel of the image; and
    control each light source to project an image value representing one or more pixels matched to the light source.

6. A vehicle comprising the light source control apparatus of claim 1, further comprising a sensor configured to detect an obstacle in front of the vehicle and generate obstacle information of the detected obstacle,
    wherein the controller is configured to change the first resolution of the image further based on the obstacle information.

7. The vehicle of claim 6, wherein the controller is configured to:
    calculate a distance to the image projected by the light source matrix based on the obstacle information, and
    change the first resolution of the image further based on the calculated distance.

8. A lamp comprising:
    a sensor configured to sense an object in front of a vehicle and generate sensing data indicating the sensed object;
    a display configured to project an image;
    a controller configured to (1) determine, based on the sensing data, an area in front of the vehicle to which the image is to be projected and (2) select a portion of the display to be used for projecting the image to the determined area in front of the vehicle; and
    a resolution setter configured to set a resolution of the image to correspond to a size of the selected portion of the display, wherein the resolution setter is configured to decrease the resolution of the image when the resolution of the image is greater than a number of pixels in the selected portion of the display.

9. The lamp of claim 8, wherein the controller is configured to determine, based on the sensing data, whether the area in front of the vehicle is a wall surface or a ground surface.

10. The lamp of claim 9, wherein the controller is configured to control the display to project the image on the wall surface from the selected portion of the display when the determined area in front of the vehicle is the wall surface.

11. The lamp of claim 9, wherein the controller is configured to select the portion of the display based on a distance between the wall surface and the vehicle when the determined area in front of the vehicle is the wall surface.

12. The lamp of claim 9, wherein the controller is configured to control the display to project the image on the ground surface from the selected portion of the display when the determined area in front of the vehicle is the ground surface.

13. The lamp of claim 12, wherein the selected portion of the display includes a low beam area.

14. The lamp of claim 8, wherein the resolution setter is further configured to increase the resolution of the image when the resolution of the image is less than the number of pixels in the selected portion of the display.

15. The lamp of claim 8, further comprising a driving device configured to adjust a projection angle of the display.

16. The lamp of claim 15, wherein the controller is configured to control the driving device such that the image is projected from an entire area of the display when the resolution of the image is greater than a number of pixels of the display.

* * * * *